UNITED STATES PATENT OFFICE.

ISRAEL ROOS, OF FRANKFORT-ON-THE-MAIN, GERMANY.

PROCESS OF MAKING SALICYLALDEHYDE-ALPHAPHENYLMETHYL HYDRAZONE.

SPECIFICATION forming part of Letters Patent No. 483,290, dated September 27, 1892.

Application filed March 16, 1892. Serial No. 425,140. (Specimens.)

*To all whom it may concern:*

Be it known that I, ISRAEL ROOS, chemist, a subject of the King of Prussia and German Emperor, residing at Frankfort-on-the-Main, in the Kingdom of Prussia, German Empire, have invented certain new and useful Improvements in the Manufacture of a New Compound Resulting from the Reaction of Alphamethylphenyl Hydrazine and Salicylaldehyde; and I do hereby declare the following to be a full, clear, and exact description of the invention, such as will enable others skilled in the art to which it appertains to make and use the same.

This invention is based upon the reaction between alphamethylphenyl hydrazine and salicylaldehyde. Proceeding from the inference that compounds wherein the alcohol radial occupies a certain position in the molecule relatively to the hydroxide group would be characterized by certain therapeutic properties, I have endeavored to produce such a compound by the reaction of alphamethylphenyl hydrazine upon salicylaldehyde. This experiment succeeded completely, inasmuch as the desired compound was obtained by the means indicated, and, on the other hand, the compound obtained was found to possess the therapeutical property anticipated, the toxical properties of the mother substance being neutralized by the entrance of the alcohol radial.

The reaction is practically carried out as follows: Equal molecules of unsymmetrical alphamethylphenyl hydrazine

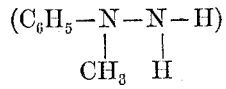

and salicylaldehyde are made to react upon each other, this being effected either direct or in a solvent such as methyl-alcohol, ethyl-alcohol and the like. The reaction takes place without external heating, and there is eliminated under considerable evolution of heat a molecule of water, according to the following equation:

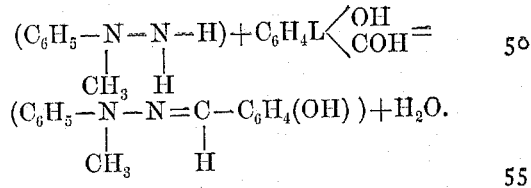

After cooling a well-crystallized reaction product is formed that can be considered as salicylaldehyde - alphamethylphenyl hydrazone. By recrystallizing out of alcohol the new body is obtained in a pure state. Instead of dissolving the alphamethylphenyl hydrazine and the salicylaldehyde in one and the same solvent, such as methyl-alcohol, ethyl - alcohol, &c., each body can be dissolved in a separate solvent. Thus, for example, the alphamethylphenyl hydrazine can be dissolved in dilute acid and the salicylaldehyde in dilute alkali. On combining the two solutions salicylaldehyde - alphamethylphenyl hydrazone is formed, while the acid and the alkali combine to form a salt, which can be separated from the salicylaldehyde-alphamethylphenyl hydrazone in the known manner by washing and crystallization. Salicylaldehyde-alphamethylphenyl hydrazine is also formed if alphamethylphenyl hydrazine and salicylaldehyde dissolved either alone or in one of the above-named solvents is heated for some time on a water bath.

The new compound in a pure state forms white crystals in the form of small leaves, melts at 73° centigrade, is insoluble in water, but soluble in alcohol, ether, benzol, ligroin, &c. On boiling with concentrated hydrochloric acid it is decomposed. This new compound is useful for therapeutical purposes.

This new remedy is adapted for the cure of rheumatism, the symptoms of which disappear after the patient has taken the remedy for a few days in doses of half a gram three times a day.

What I claim is—

1. The chemical composition salicylaldehyde-alphamethylphenyl hydrazone, the same being a white crystalline powder, which melts at 73° centigrade, is insoluble in water, but soluble in alcohol and benzone, and is decomposed by boiling it in concentrated hydrogen chloride, substantially as hereinbefore described.

2. The method of making salicylaldehyde-alphamethylphenyl hydrazone, which consists in combining together salicylaldehyde and alphamethylphenyl hydrazine, substantially as and in the proportions hereinbefore set forth.

In witness whereof I affix my signature in presence of two subscribing witnesses.

ISRAEL ROOS.

Witnesses:
FRANK H. MASON,
JEAN GRUND.